J. A. THOMPSON.
SIGNALING DEVICE FOR MOTOR VEHICLES.
APPLICATION FILED JAN. 8, 1913.
1,138,809.
Patented May 11, 1915.
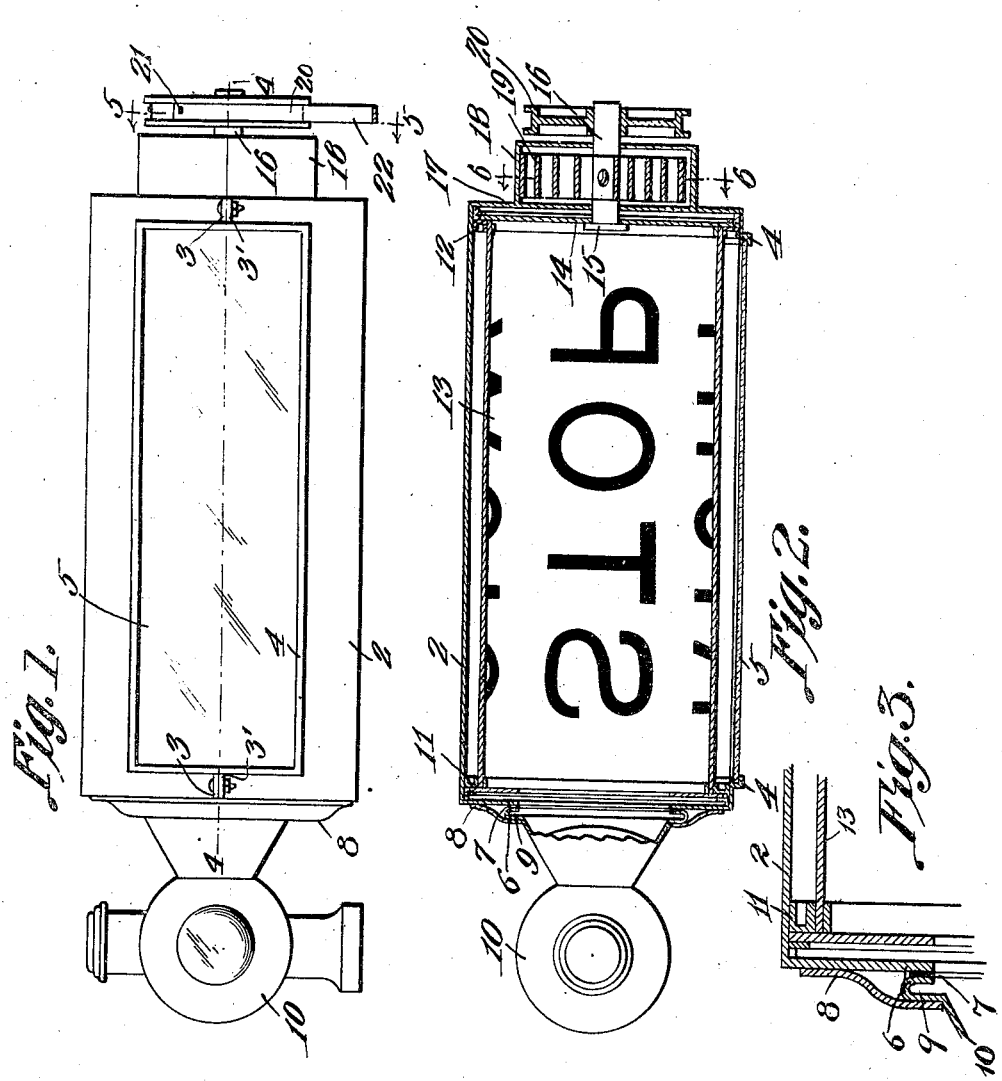
John A. Thompson,
Inventor
by C.A.Snow & Co.
Attorneys
Witnesses

UNITED STATES PATENT OFFICE.

JOHN A. THOMPSON, OF ROSEBANK, NEW YORK.

SIGNALING DEVICE FOR MOTOR-VEHICLES.

1,138,809.

Specification of Letters Patent. Patented May 11, 1915.

Application filed January 8, 1913. Serial No. 740,877.

*To all whom it may concern:*

Be it known that I, JOHN A. THOMPSON, a citizen of the United States, residing at Rosebank, in the county of Richmond and State of New York, have invented a new and useful Signaling Device for Motor-Vehicles, of which the following is a specification.

The present invention relates to improvements in signaling devices for motor vehicles, one object of the invention being the provision of a horizontally disposed cylindrical casing adapted to be connected to the rear of a motor vehicle to receive the lens support of a tail lamp, so that the rays of the light from the tail lamp will be projected into the cylinder and illuminate a rotatably mounted cylinder either of translucent or transparent material and carrying the various signal signs which are adapted to be projected one at a time through an observation aperture in the outer or stationary cylinder, the inner cylinder being returned to normal position by a spring, while a manually controlled mechanism is provided for operating to select the inner cylinder to expose to view the desired signal.

With the foregoing and other objects in view which will appear as the description proceeds the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a view in elevation showing the present device attached to the tail lamp. Fig. 2 is a view taken on line 4—4 of Fig. 1. Fig. 3 is an enlarged detail sectional view illustrating that portion of the casing adjacent the lamp, showing the means whereby the rim of the lens of the lamp is engaged and clamped to the casing.

Referring to drawings, the stationary cylinder or casing is adapted to be attached to the rear of the automobile, and said casing is made in two sections and clamped together through the medium of the lugs 3 and bolts 3' at the front thereof, as clearly illustrated in Fig. 1. A frame or flanged portion 4 is provided around the sight slot or aperture of the casing and retains the observation glass 5 in proper relative position at all times.

One end of the casing 2, is provided with an apertured disk 6, carrying the rubber gasket 7 and the lamp engaging annulus, ring or flange 8 which fits upon and embraces the rim of the lens carrying portion 9 of the tail lamp 10. By this means the rays of light from the lamp are projected into and through one end of the cylindrical casing 2.

Disposed fixedly within the cylindrical casing 2 adjacent the respective ends thereof, are the retaining and bearing rings 11 and 12, which constitute a supporting means to retain the concentric sign carrying cylinder 13 in proper relation within the casing 2 and also so that said sign carrying cylinder 13 may be properly rotated to place one of its respective signs at a time in observation position or adjacent to the observation aperture of the casing 2, so that the rays of light will be projected through the transparent or translucent cylinder 13 to display the sign in view through the transparent plate 5 of the casing 2.

The disk 14, secured in the end of the cylinder 13 remote from the end adjacent the tail lamp 10, has connected concentrically thereto, the head 15 of the journaling and operating stud or shaft 16, which as clearly shown in Figs. 1 and 2 is projected concentrically through the opposed end 17 of the casing 2 and through the motor or spring casing 18. Disposed within the casing 18 is the spring 19, which is connected to the shaft 16 and to the casing so as to exert a normal tension to retain, as for instance, at the word "Stop," indicating that the automobile is at a standstill.

Keyed upon the outer end of the shaft 16, is a pulley 20, which has secured to its grooved periphery at 21, the operating tape or band 22, which is to be operated in any desirable or practical manner.

What is claimed is:

A vehicle signal device including a cylindrical casing having an observation aperture and a light ray directing aperture formed in the wall thereof, a rotatable sign carrier carried within the casing and operable through one end of the casing, a lamp engaging member carried at the other end of the casing and comprising an apertured disk, a gasket fitting upon the outer face thereof and about the aperture and an annulus secured to the disk to coöperate with the disk and the gasket to form a clamp at one end of the casing.

In testimony that I claim the foregoing as my own, I have hereto affixed my signature in the presence of two witnesses.

JOHN A. THOMPSON.

Witnesses:
JOHN TIMLIN, Jr.,
H. E. BISSEL.